United States Patent [19]

Kimura et al.

[11] Patent Number: 5,595,948
[45] Date of Patent: Jan. 21, 1997

[54] MAGNESIA-TITANIA REFRACTORY AND METHOD FOR MANUFACTURING THE SAME

[75] Inventors: Etsuji Kimura, Saitama-ken; Kenichi Yamaguchi, Fukushima-ken; Fumihiko Ogino; Susumu Okabe, both of Saitama-ken, all of Japan

[73] Assignee: Mitsubishi Materials Corporation, Tokyo, Japan

[21] Appl. No.: 491,173

[22] Filed: Jun. 16, 1995

[30] Foreign Application Priority Data

Jun. 22, 1994 [JP] Japan .................................. 6-163142

[51] Int. Cl.⁶ .......................... C04B 35/03; C04B 35/04; C04B 35/043
[52] U.S. Cl. .................. 501/108; 501/112; 501/113; 501/114; 501/117
[58] Field of Search .................................. 501/108, 112, 501/113, 114, 117

[56] References Cited

U.S. PATENT DOCUMENTS 2,639,993  5/1953  Heuer ........................ 501/108
3,540,900  11/1970  Guile ........................ 501/117
3,632,698  1/1972  Crespi ....................... 501/117
4,125,407  11/1978  Ueno ........................ 501/108

Primary Examiner—Mark L. Bell
Assistant Examiner—Louis M. Troilo
Attorney, Agent, or Firm—Webb Ziesenheim Bruening Logsdon Orkin & Hanson P.C.

[57] ABSTRACT

A refractory is disclosed which contains integrally sintered magnesia particles forming the skeleton of the refractory and a mineral phase of magnesium orthotitanate ($Mg_2TiO_4$) formed between the magnesia particles, thus giving an increased erosion resistance. Preferably, the refractory comprises coarse magnesia particles having an average particle diameter of at least 1 mm or a mixture of coarse magnesia particles having an average particle diameter of at least 1 mm and medium magnesia particles having an average particle diameter of 1 to 0.15 mm and 5 to 50 wt. % of magnesium orthotitanate intervening between the magnesia particles. The refractory not only has an excellent durability in a basic atmosphere, but also has a high strength because of combination of the coarse or medium magnesia particles so that it does not tend to deform and has a high durability against thermal shock.

14 Claims, 5 Drawing Sheets

MAGNESIA-TITANIA REFRACTORY AND METHOD FOR MANUFACTURING THE SAME

FIELD OF THE INVENTION

The present invention relates to a basicity-resistant refractory which has excellent high-temperature strength and high thermal stability and is excellent in durability against high temperature basic melts such as calcium ferrite slag. The refractory of the present invention is useful particularly as a material for a refractory brick and a furnace tube for a refining furnace or a kiln, in contact with basic melt or calcined mass such as those containing much iron oxides.

BACKGROUND OF THE INVENTION

For the purpose of protecting furnace components from high temperatures, the walls of various furnaces used for smelting/refining metals and various kilns used for manufacturing cement are lined with refractory materials. Refractory materials are used also for a crucible, a furnace tube, a muffle and other appliances applied for melting the content at high temperatures. These refractories include, depending upon service environments, acidic refractories mainly containing $SiO_2$ or $ZrO_2$, neutral refractories mainly containing $Cr_2O_3$ or $Al_2O_3$, and basic refractories mainly containing MgO or CaO. For example, a basic refractory is used in an environment in which it is exposed to basic melts, calcined masses or gases.

Among the conventional basic refractory materials, representative examples include the one mainly containing magnesium oxide, or magnesia, (MgO). For example, magnesia-chromia (Mg oxide-Cr oxide) refractory materials are largely used because those consisting of magnesia alone are insufficient in their spalling resistance and erosion resistance. However, the magnesia-chromia refractory materials, having an advantage of being high in refractoriness and load test value, is defective in that chrome and oxides thereof cause environmental pollution, so that there is a demand for developing their substitutes. While they exhibit a satisfactory erosion resistance against basic melts, the magnesia-chromia refractory materials have in effect limited erosion resistances against high temperature basic melts rich in iron oxides. This is attributable to the fact that, upon contact with high-temperature basic melts, the components of the refractory material react with the iron oxides in the melt to form a modified layer that has an unsatisfactory stability, so that erosion proceeds gradually.

More specifically, as shown schematically in FIG. 6, a magnesia-chromia refractory material or brick 50 has a structure in which magnesia particles 51 and composite oxide particles 52 comprised by fired products of magnesia and chromia are mutually integrally sintered. Upon contact with a high-temperature melt 54 rich in iron oxides (Fe oxides), the melt 54 penetrates through gaps between the particles into the surface layer of the brick 50, and the Fe oxides in the melt react with the magnesia and chromia, respectively, in the brick to form Fe-rich spinel phases 53 comprising magnesium ferrite ($MgFe_2O_4$) and iron chromium oxide ($FeCr_2O_4$) along grain boundaries of the surface layer. During formation of these spinel phases, crystal grains of the above-mentioned particles expand, and as a result, combination of the spinel phases with the magnesia particles 51 and the composite oxide particles 52 of the non-spinel phases is broken. $MgFe_2O_4$, a spinel component, tends to be easily eroded by alkaline components in the melt, in spite of the high melting point of 1,900° C. the surface layer of the refractory brick 50 is considered to be eroded and damaged for these reasons.

Because the erosion resistance of the magnesia-chromia refractory material is limited in effect against a high-temperature basic melt rich in Fe oxides, it is inevitable to take countermeasures therefore such as the use of electrocast materials or bricks which make the texture denser and prevent the penetration of melts at portions subject to serious erosion of refractory bricks in a smelting/refining furnace or a kiln in which such melts and calcined masses as described above are produced, and this is causing a heavy economic burden. Refractory materials containing CaO or $Al_2O_3$ are also known. However, also such magnesia-calcia and magnesia-alumina refractories have insufficient erosion resistances against strongly basic slags containing a large amount of Fe oxides such as calcium ferrite slag.

The present inventors have previously developed a magnesia-based refractory material having excellent durability or erosion resistance also in basic environments by firing magnesia as a main component together with a metal oxide such as titanium oxide as disclosed in Japanese Patent Application No. 5-237436. This refractory material, upon contact with an Fe-containing basic melt such as calcium ferrite slag, forms a high melting point composite oxide (spinel solid solution) as a result of reaction between the iron in the melt and the magnesia and titanium oxide or titania in the refractory material. This composite oxide covers the surface layer of the refractory material and refractory particles such as magnesia particles and the like, so that the refractory material has an excellent erosion resistance.

The present invention has an object to provide a further improved magnesia-based basicity resistant refractory material which has an excellent chemical stability in high-temperature basic atmospheres and an improved thermal stability (spalling resistance).

SUMMARY OF THE INVENTION

The present invention provides a refractory which contains integrally sintered magnesia particles forming the skeleton of the refractory and a mineral phase of magnesium orthotitanate ($Mg_2TiO_4$) formed between the magnesia particles, thus giving an increased erosion resistance. Preferably, the refractory of the present invention is the one which comprises coarse magnesia particles having an average particle diameter of at least 1 mm or a mixture of coarse magnesia particles having an average particle diameter of at least 1 mm and medium magnesia particles having an average particle diameter of 1 to 0.15 mm and 5 to 50 wt. % of magnesium orthotitanate intervening between the magnesia particles. This refractory not only has an excellent durability in a basic atmosphere, but also has a high strength because of combination of the coarse or medium magnesia particles so that it does not tend to deform and has a high durability against thermal shock.

That is, the present invention provides the following refractory materials:

(1) A refractory comprising integrally sintered magnesium oxide particles and a mineral phase of magnesium orthotitanate ($Mg_2TiO_4$) intervening between the magnesium oxide particles.

(2) The refractory as in (1) above, wherein the content of the magnesium orthotitanate is 4 to 50 wt. %, preferably 4 to 40 wt. %.

(3) The refractory as in (1) or (2) above, wherein the mineral phase of magnesium orthotitanate intervenes between coarse magnesium oxide particles having an average particle diameter of at least 1 mm.

(4) The refractory as in (1) or (2) above, wherein the mineral phase of magnesium orthotitanate intervenes coarse magnesium particles having an average particle diameter of at least 1 mm and medium magnesium particles having an average particle diameter of 1 to 0.15 mm.

(5) The refractory as in (4) above, wherein the refractory contains 10 to 50 wt. % of the coarse magnesium oxide particles and 10 to 50 wt. % of the medium magnesium oxide particles, with the sum being 50 to 95 wt. %, preferably 50 to 80 wt. %, based on the total weight of the refractory.

(6) The refractory as in any one of (1) to (5) above, wherein the refractory has an apparent porosity of 12% to 20% and a spalling time number of at least 20.

Also, the present invention provides a preferred method for manufacturing the above-described refractory, preferably a method for manufacturing a refractory having a mineral phase of magnesium orthotitanate intervening between magnesium oxide particles integrally sintered, by uniformly mixing coarse magnesium oxide particles having an average particle diameter of at least 1 mm or coarse magnesium oxide particles having an average particle diameter of at least 1 mm and medium magnesium oxide particles having an average particle diameter of 1 to 0.15 mm as starting material with fine titanium oxide particles and firing the mixture, thereby a mineral phase of magnesium orthotitanate intervening between the particles of magnesium oxides.

That is, the present invention provides the following manufacturing methods:

(7) A method for manufacturing a refractory having a mineral phase of magnesium orthotitanate intervening between magnesium oxide particles integrally sintered, comprising uniformly mixing coarse magnesium oxide particles with fine titanium oxide particles and firing the mixture.

(8) The method as in (7) above, wherein coarse magnesium oxide particles having an average particle diameter of at least 1 mm or a mixture of coarse magnesium oxide particles having an average particle diameter of at least 1 mm and medium magnesium oxide particles having an average particle diameter of 1 to 0.15 mm are or is uniformly mixed with titanium oxide particles having an average particle diameter of at most 0.15 mm and the mixture is fired.

(9) The method as in (7) or (8) above, wherein 75 to 98 wt. % of magnesium oxide and 2 to 25 wt. % of titanium oxide, preferably 80 to 98 wt. % of magnesium oxide and 2 to 20 wt. % of titanium oxide, are mixed and fired.

Further, in the above-described manufacturing method, a refractory having an adjusted particle size as well as further improved high-temperature strength and thermal stability can be obtained by, in a first stage, firing magnesium oxide and titanium oxide to form a mixture of magnesium orthotitanate and magnesium oxide, pulverizing the fired product to form fine particles, and, in a second stage, adding the fine particles to coarse or medium magnesium oxide which constitute the skeleton of the refractory, mixing and integrally sintering the mixture.

That is, the present invention provides the following improved manufacturing methods:

(10) A method for manufacturing the refractory of claim 1, comprising firing a mixture of magnesium oxide and titanium oxide to form a primary sintered mass, pulverizing the primary sintered mass to form fine particles, adding the fine particles to coarse or coarse and medium magnesium oxide particles, and heating the mixture to carry out secondary sintering to obtain the above refractory.

(11) The method as in (10) above, wherein a mixture of 50 to 96 wt. % of magnesium oxide and 4 to below 50 wt. % of titanium oxide is fired at 1,400° to 1,700° C. to form a primary sintered mass, the primary sintered mass is pulverized to form fine particles having an average particle diameter of at most 0.15 mm, 5 to 50 wt. %, preferably 20 to 50 wt. %, of the pulverizate thus obtained is uniformly mixed with 50 to 95 wt. %, preferably 50 to 80 wt. %, of coarse or coarse and medium magnesium oxide particles so that the magnesium orthotitanate content is 4 to 50 wt. %, preferably 4 to 40 wt. %, based on the total weight of the composition, and the mixture is heated at 1,400° to 1,700° C. to carry out secondary sintering to obtain the above refractory.

Also, the refractory of the present invention can be manufactured using as a starting material magnesium orthotitanate in place of titanium oxide. That is, according to the present invention, there are provided the following manufacturing methods using magnesium orthotitanate as a starting material:

(12) A method for manufacturing a refractory having a mineral phase of magnesium orthotitanate intervening between magnesium oxide particles integrally sintered, comprising uniformly mixing coarse magnesium oxide particles with fine magnesium orthotitanate particles and sintering the mixture.

(13) The method as in (12) above, wherein coarse magnesium oxide particles having an average particle diameter of at least 1 mm or a mixture of coarse magnesium oxide particles having an average particle diameter of at least 1 mm and medium magnesium oxide particles having an average particle diameter of 1 to 0.15 mm are or is uniformly mixed with titanium oxide particles having an average particle diameter of at most 0.15 mm and the mixture is sintered.

(14) The method as in (12) or (13) above, wherein 50 to 96 wt. % of magnesium oxide and 4 to 50 wt. % of magnesium orthotitanate, preferably 60 to 96 wt. % of magnesium oxide and 4 to 40 wt. % of magnesium orthotitanate, are uniformly mixed and sintered.

DETAILED DESCRIPTION OF THE INVENTION

Component and Texture

Figure 1:
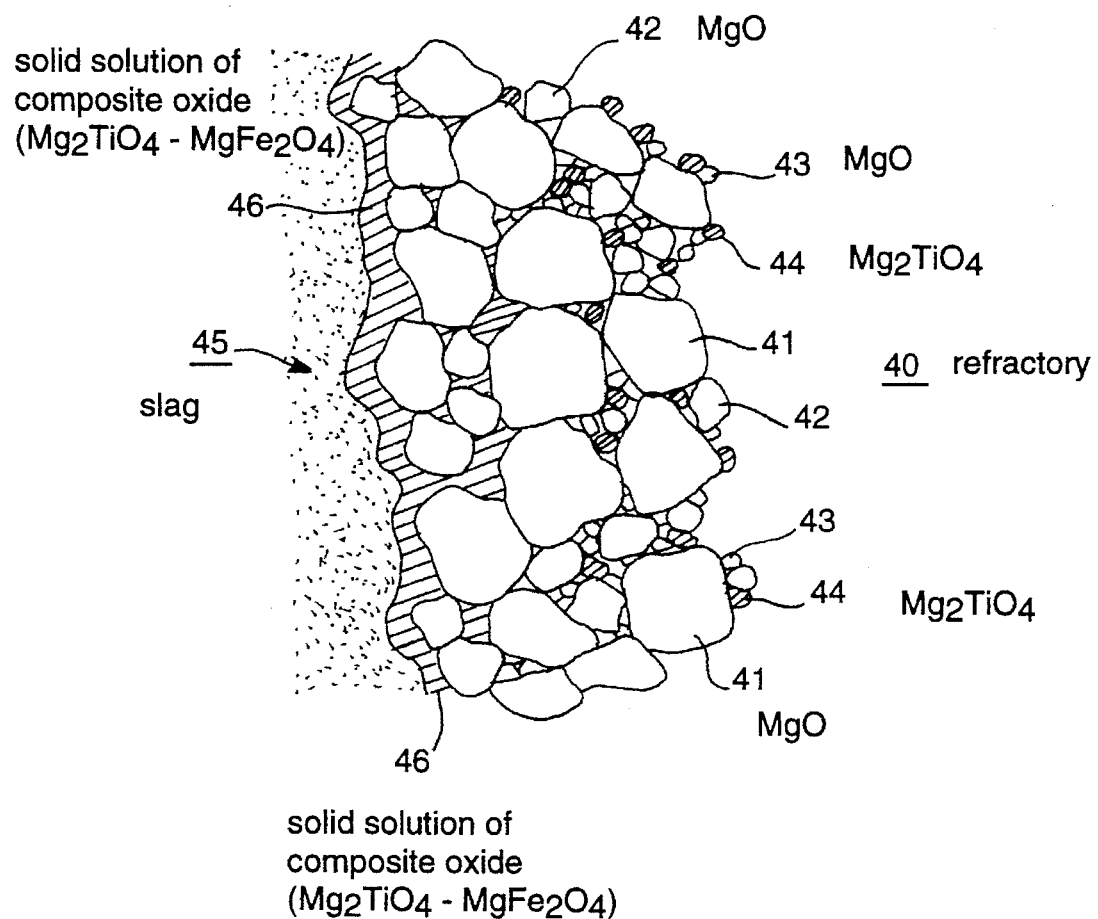
FIG. 1 is a schematic cross-sectional representation illustrating the state of the texture near the interface between the refractory and slag when the refractory of the invention is immersed in slag.

The refractory of the present invention comprises integrally sintered magnesia particles forming the skeleton and magnesium orthotitanate ($Mg_2TiO_4$) intervening between the magnesia particles. As the magnesium titanate obtained by calcining magnesia (MgO) and titanium oxide ($TiO_2$), there are known magnesium metatitanate ($MgTiO_3$), and magnesium dititanate ($MgTi_2O_5$) as well as magnesium orthotitanate ($Mg_2TiO_4$). These depend on the proportion of MgO to $TiO_2$. More specifically, when MgO is more than $TiO_2$, e.g., more than 50 wt. %, magnesium orthotitanate ($Mg_2TiO_4$) is formed while with MgO less than $TiO_2$, e.g., 33 to 50 wt. %, magnesium metatitanate ($MgTiO_3$) and magnesium orthotitanate ($Mg_2TiO_4$) are formed. When MgO is in an amount of about 33 to 20 wt. %, there are formed magnesium dititanate ($MgTi_2O_5$) and magnesium metatitanate ($MgTiO_3$), and when MgO is in an amount of below 20 wt. %, magnesium dititanate ($MgTi_2O_5$) and $TiO_2$ are formed.

Generally, titanates means metatitanates ($MgTiO_3$). The refractory of the present invention contains magnesium orthotitanate ($Mg_2TiO_4$) that intervenes between the magnesia particles. Magnesium orthotitanate is a high melting composite oxide having a melt temperature of 1,756° C., in which a mineral phase of magnesium orthotitanate is present between the magnesia particles, and as a result the refractory, upon contact with a high-temperature basic melt, effectively prevents the penetration of a high-temperature melt through between the magnesia particles constituting the skeleton of the refractory. Also, upon contact with an Fe-containing basic melt, the mineral phase reacts with Fe to form on the surface of the refractory a solid solution phase of a composite oxide (spinel solid solution) which is very stable against the basic melt, and the composite oxide phase securely prevents the penetration of the basic melt into the inside of the refractory so that the basic melt does not penetrate into the inside of the refractory, thus exhibiting excellent erosion resistance.

On the other hand, the melting points of magnesium metatitanate and magnesium dititanate are 1,630° C. and 1,620° C., respectively, which are lower than the melting point of magnesium orthotitanate, and the composite oxides (pseudo brookite, etc.) which are formed upon their contact with an Fe-containing basic melt have poorer erosion resistances and much lower melting temperatures than the above-described composite oxides (spinel solid solution). Therefore, the refractory having these magnesium titanate phases are low in thermal stability and durability against basic atmosphere as compared those having magnesium orthotitanate phases.

In the refractory of the present invention, magnesia particles as the main component are of such a structure that they include coarse particles having an average particle diameter of at least 1 mm, preferably 1 to 4 mm, and medium particles having an average particle diameter of 1 to 0.15 mm, and preferably fine particles having an average particle diameter of less than 0.15 mm, and between the coarse, medium or fine magnesia particles, there intervenes a mineral phase of magnesium orthotitanate.

As the starting material, the magnesia particles are used in proportions of 10 to 50 wt. %, preferably 20 to 40 wt. %, of coarse particles and 10 to 50 wt. %, preferably 20 to 40 wt. %, of medium particles, with the sum suitably being 50 to 95 wt. %, preferably 50 to 80 wt. %. With below 50 wt. % of coarse or medium magnesia particles, no sufficient mechanical strength can be obtained. When the coarse and medium magnesia particles are used in proportions below 10 wt. %, respectively, the effect of mixing them is poor.

The integrally sintered coarse or medium magnesia particles serves as an aggregate and maintains the strength of the refractory, and exhibit sufficient mechanical strength against compression, bending, creep and refractoriness under load. When the proportion of the magnesia particles is lower than the above-described range, lack of strength tends to occur. The coarse and medium magnesia particles are used usually in approximately the same amount. However, they need not be used in the same amount. It is preferred that the coarse and medium magnesia particles be contained in amounts not smaller than 10 wt. %, respectively. In those refractories which contain proper amounts of these particles, the medium magnesia particles intervene the coarse magnesia particles, thus making the texture of the refractory denser to increase its mechanical strength and prevent contraction and cracking upon sintering.

The fine magnesia particles together with magnesium orthotitanate serves as a substratum which fills the gaps between the coarse and medium magnesia particles. The porosity of a refractory depends on the amount of these fine particles. In the refractory of the present invention, the mineral phase of magnesium orthotitanate fills the gaps between a multiplicity of magnesia particles and the magnesia particles are sintered firmly through the mineral phase so that the fine magnesia particles do not have to be contained.

The mineral phase of magnesium orthotitanate may be the one which is formed by uniformly mixing the coarse and medium magnesia particles with fine particles of magnesium orthotitanate and integrally sintering them or the one which is formed by uniformly mixing the coarse and medium magnesia particles with the fine titanium oxide particles and sintering them in order to react magnesia with titanium oxide to form magnesium orthotitanate phases along the grain boundaries of the magnesia particles. By reacting 2 to 25 wt. % of titanium oxide ($TiO_2$) based on the weight of magnesia (MgO), 4 to 50 wt. % of $Mg_2TiO_4$ is formed.

Upon mixing magnesium orthotitanate with magnesia and integrally sintering them, or upon mixing magnesia with titanium oxide and sintering to form magnesium orthotitanate phases along the grain boundaries, the starting material magnesium orthotitanate or titanium oxide is preferably in the form of fine particles having an average particle diameter of not larger than 0.15 mm. With the particle diameter larger than 0.15 mm, the fine particles do not so much differ from the coarse or medium magnesia particles and, hence, it is difficult to cover the surfaces of the magnesia particles with the phase of magnesium orthotitanate. As a result, there are dispersed many portions where the mineral phases of magnesium orthotitanate do not intervene between the magnesia particles and basic melts will penetrate through the portions, which makes insufficient erosion resistance against the basic melts.

Suitable amount of magnesium orthotitanate in the refractory is 4 to 50 wt. %, preferably 4 to 40 wt. %. when the amount of magnesium orthotitanate is less than the above-described range, it is hard to fill the gaps between the magnesia particles with magnesium orthotitanate sufficiently so that durability and thermal stability do not increase in basic atmospheres. On the other hand, with the amount of magnesium orthotitanate above the above-described range, the amount of magnesia decreases relatively so that the refractory has an insufficient strength.

In this connection, it should be noted that in order to increase erosion resistance in basic atmospheres, at least 2 wt. % of magnesium orthotitanate (1 wt. % as titanium oxide) may be sufficient. However, this amount is insufficient in order to increase high-temperature strength and thermal stability as well as erosion resistance, and it is preferred to adjust the particles of the starting material such as magnesia to the afore-mentioned particle size ranges. For increasing high-temperature and thermal stability without adjusting the particle size of the starting material particles, there is needed 20 wt. % or more magnesium orthotitanate (10 wt. % or more as titanium oxide) while the one whose particle size is adjusted to the above-described ranges requires only 4 wt. % or more of magnesium orthotitanate (2 wt. % or more as titanium oxide).

The refractory of the present invention has an apparent porosity of preferably at least 12% and at most 20%. When the porosity is below 12%, the thermal stability (spalling resistance) decreases. That is, when thermal load is applied upon use at high temperatures, there is the disadvantage that the surface peels off because of strains due to difference in thermal expansion between the surface and inside of the refractory. Also, when there occur small cracks due to difference in thermal expansion, propagation of cracking is difficult to absorb so that there is the danger that cracking proceeds toward the inside of the refractory or that local thermal stress cannot be absorbed, leading to the breakage of the refractory. On the other hand, at a porosity of above 20%, the refractory has a decreased erosion resistance since upon contact with a melt, the melt tends to penetrate into the refractory easily.

The adjustment of porosity may be carried out by conventional methods such as adjustment of the particle size of the starting powder, adjustment of temperature and time for pressure molding or firing after mixing the starting materials, or the like. For example, a relatively low specific gravity refractory having a porosity of 12 to 20% can be manufactured by mixing the coarse, medium and fine magnesia particles in proportions within the above-described ranges, adding thereto fine particles of magnesium titanate and kneading, pressure molding the mixture at a pressure of 1,200 Kg/cm$^2$, and then firing at 1,400° to 1,700° C. over 5 to 30 hours.

The excellent erosion resistance of the refractory of the present invention against a basic melt rich in Fe oxides may be attributed to the fact that, upon contact of the refractory with a melt rich in Fe oxides, Fe oxides in the melt react with the magnesia to form magnesium ferrite ($MgFe_2O_4$), which together with magnesium orthotitanate ($Mg_2TiO_4$) forms a uniform solid solution phase of a composite oxide. This composite oxide prevents penetration of the melt into the refractory by covering the surfaces of the refractory and of magnesia particles. The solid solution phase of the composite oxide is very stable against basic melts, and the magnesia particles are covered with the composite oxide so that strong bonding can be maintained and no decrease in mechanical strength occurs.

Particularly, in the refractory of the present invention, the particle size of the magnesia is adjusted and fine magnesia particles and the mineral phases of magnesium orthotitanium are present in gaps between the medium and coarse magnesia particles such that they surround the coarse and medium magnesia particles, with the result that when the refractory is in contact with a basic melt, the reaction between Fe in the melt and the fine magnesia particles and magnesium orthotitanate proceeds rapidly and the solid solution phases of the resulting composite oxide fill the gaps between the magnesia particles so that the penetration of the melt can be prevented near the surface of the refractory securely. Moreover, formation of the composite oxide so that it surrounds the medium and coarse particles constituting the skeleton of the refractory prevents effectively the erosion of the magnesia particles with the melt, so that firm bonding between the magnesia particles can be maintained. As a result, the refractory exhibits excellent erosion resistance in basic atmospheres and are high in thermal stability and mechanical strength at high temperatures.

The refractory of the present invention is illustrated as an example schematically in FIG. 1. The illustrated refractory 40 has a structure in which fine particles of magnesium orthotitanate 44 and fine particles of magnesia 43 intervene between coarse and medium magnesia particles 41, 42. When the refractory 40 is in contact with a high-temperature melt 45 rich in Fe, the melt 45 penetrates into the surface layer through gaps between magnesia particles 41 to 43 and magnesium orthotitanate particles 44, and the magnesia particles in the main component react with Fe in the melt to form magnesium ferrite, which in turn forms a solid solution with magnesium orthotitanate to give rise to a solid solution phase comprised by a high-melting point composite oxide 46. The composite oxide 46 fills the gaps between the magnesia particles 41 and 42 such that it surrounds these particles, so that the melt cannot penetrate into the inside of the refractory, thus preventing the magnesia particles constituting the skeleton of the refractory from being eroded by the melt. As a result, the internal structure of the refractory does not suffer from damages and the mechanical strength of the refractory can be maintained.

In this connection, it should be noted that magnesium metatitanate ($MgTiO_3$) and magnesium dititanate ($MgTi_2O_5$) do not form a solid solution with magnesium ferrite ($MgFe_2O_4$) but exist as coexisting phases. That is, no uniform composite oxide is formed, with the result that its erosion resistance against basic melts is inferior to the case where magnesium orthotitanate is used.

The refractory of the present invention can be used for various purposes depending on its porosity. For example, a low density preparation of the above-described refractory, which contains much space and, hence, has a high adiabatic effect, is suitable for use as a lining for smelting/refining furnaces in which basic melts are treated. On the other hand, a high density preparation of the above-described refractory, in which the magnesia particles are sintered densely through the magnesium orthotitanate phases and, hence, has a good thermal conductivity, and accordingly a good heat transfer property, is suitable for crucibles or materials for furnace tubes. Since the high density refractory also has an excellent heat shock resistance, it can be used for sensors for sensing high-temperature melts for which alumina pipes and the like have conventionally been used, for example, as a protective tube for various terminals of measuring apparatuses, e.g., thermocouples, which contact a high-temperature melt.

Manufacturing Method 1 (Directbond Method)

The refractory of the present invention can be manufactured by uniformly mixing coarse and medium magnesia particles with fine particles of titanium oxide and sintering to react magnesia with titanium oxide to form mineral phases of magnesium orthotitanate along the grain boundaries of the magnesia particles.

Suitably, mixing proportion of magnesia to titanium oxide is 75 to 98 wt. % of magnesia to 2 to 25 wt. % of titanium oxide, preferably 80 to 98 wt. % of magnesia to 2 to 20 wt. % of titanium oxide. The amount of titanium oxide must be smaller than the amount of magnesia. When the amount of titanium oxide is larger than that of magnesia, $Mg_2TiO_4$ is not formed. With the amount of titanium oxide less than 2 wt. %, there can be obtained no sufficient erosion resistance against basic melts. Inclusion of 2 to 25 by weight, preferably 2 to 20 wt. % of titanium oxide as the starting material allows formation of 4 to 50 wt. %, preferably 4 to 40 wt. %, of $Mg_2TiO_4$ in the refractory after firing.

Firing of the above-described starting materials is carried out by heating them at 1,400° to 1,700° C. over 5 to 30 hours. At firing temperatures below 1,400° C., there is the disadvantage that the formation of $Mg_2TiO_4$ is insufficient while at firing temperatures not lower than 1,756° C., there occur mixed phases of MgO and a liquid phase and thus failing to give rise to a texture in which mineral phases of $Mg_2TiO_4$ distribute uniformly between MgO particles. Firing time shorter than 5 hours results in insufficient firing while use of heating over no shorter than 30 hours is undesirable since it gives no substantial difference but gives the possibility that the above-described mixed phases are formed locally. The starting materials may be fired in the open air.

As for the particle sizes of magnesia and titanium oxide, it is preferred that the particle diameter of titanium oxide be sufficiently small as compared with that of magnesia. That is, it is sufficient to mix fine titanium oxide powder with coarse or medium magnesia powder and heating the mixture for firing. In this case, the titanium oxide particles surrounds the magnesia particles, the main component, and the mineral phases of $Mg_2TiO_4$ are formed such that they cover the magnesia particles.

More specifically, a starting material is a mixture of fine titanium oxide particles having an average particle diameter of at most 0.15 mm with magnesia which comprises 10 to 50 wt. % of coarse magnesia particles having an average particle diameter of at least 1 mm, preferably 2 to 5 mm, and 10 to 50 wt. % of medium magnesia particles having an average particle diameter of 1 to 0.15 mm, preferably 0.8 to 0.3 mm, the sum of the coarse and medium particles being 50 to 95 wt. %, preferably 50 to 80 wt. %.

Within the ranges where the amount of coarse or medium magnesia particles in the refractory is not below 50 wt. %, fine magnesia particles having an average particle diameter of at most 0.15 mm may be added in addition to the above-described fine titanium oxide particles. In this connection, it should be noted that no sufficient mechanical strength can be obtained with below 50 wt. % of the coarse or medium magnesia.

When magnesia and titanium oxide are not subjected to particle size adjustment as described above, but only coarse particles are used, in order to increase erosion resistance in basic atmospheres and high-temperature strength and thermal stability of the refractory, it is necessary to use at least 10 wt. % of titanium oxide. On the other hand, the adjustment of the starting materials to the above-described particle size ranges, the refractory containing about 2 wt. % of titanium oxide is high in high-temperature strength and thermal stability as well as in erosion resistance in basic atmospheres.

By mixing fine particles of titanium oxide to coarse or medium magnesia particles and mixing uniformly, and then firing the mixture at 1,400° to 1,700° C. over 5 to 30 hours, there can be obtained a refractory in which mineral phases of Mg2TiO4 are formed along the grain boundaries of the magnesia particles by the reaction of the magnesia particles with titanium oxide.

A relatively low density refractory having a porosity of 12 to 20% can be manufactured by pressure molding a starting material composed of a mixture of magnesia and titanium oxide having the above-described particle diameters, respectively, at a pressure of 1,200 to 1,300 Kg/cm$^2$ and firing the molded article.

A high density refractory having a porosity of 10% or less can be manufactured by adding titanium oxide powder having an average particle diameter of 0.05 mm or less to fine magnesia particles having an average particle diameter of 0.1 mm or less, uniformly mixing them, compression molding the mixture at a pressure of 1,200 to 1,300 Kg/cm$^2$, and then firing at 1,500° to 1,700° C. over 1 to 10 hours.

Manufacturing Method 2 (Semi-Rebond Method)

The refractory of the present invention can be manufactured by in a first stage firing magnesium oxide and titanium oxide to form a mixture of magnesium orthotitanate and magnesium oxide, pulverizing the mixture to fine particles, and in a second stage adding the fine particles to coarse or medium magnesium oxide particles constituting the skeleton of the refractory, mixing the resulting mixture uniformly, and integrally sintering it.

More specifically, 4 to less than 50 wt. % of titanium oxide is added to at least 50 wt. % of magnesia, the mixture is mixed uniformly and pulverized to 100 mesh or less, subjected to a primary firing at 1,400° to 1,700° C. over 10 to 20 hours to allow magnesia to react with titanium oxide to form magnesium orthotitanate ($Mg_2TiO_4$). The sintered mass contains at least 8 wt. % of $Mg_2TiO_4$ depending on the amounts of unreacted magnesia and titanium oxide.

Next, the primary sintered mass is pulverized to fine particles having an average particle diameter of at most 0.15 mm, and the fine particles of the sintered mass are added to coarse magnesia particles or to coarse and medium magnesia particles so that the content of $Mg_2TiO_4$ in the refractory is 4 to 50 wt. %, preferably 4 to 40 wt. %. In order to maintain the mechanical strength of the refractory, magnesia constituting the skeleton of the refractory suitably comprises 10 to 50 wt. % of coarse particles and 10 to 50 wt. % of medium particles, with the sum being 50 to 95 wt. %, preferably 50 to 80 wt. %, based on the total weight of the magnesia particles. Therefore, the fine particles of the sintered mass is added to the magnesia having the above-described particle diameter suitably in an amount of 20 to 50 wt. %, and fine particles of the sintered mass containing at least 8 wt. % of $Mg_2TiO_4$ is used in order for $Mg_2TiO_4$ to exist in an amount of 4 to 50 wt. %, preferably 4 to 40 wt. %. With the sintered mass containing below 8 wt. % of $Mg_2TiO_4$, the content of $Mg_2TiO_4$ in the refractory cannot be at least 4 wt. % even when the fine particles of the sintered mass are added in an amount of 50 wt. %. In this connection, it should be noted that in order to obtain a sintered mass containing at least 8 wt. % of $Mg_2TiO_4$, it is necessary to use a mixture of magnesia containing at least 4 wt. % of titanium oxide and titanium oxide.

A uniform mixture of the coarse magnesia particles or the coarse and medium magnesia particles with the fine particles of the sintered mass is pressure molded at a pressure of 1,100 to 1,300 Kg/cm², and heated at 1,400° to 1,700° C. over 10 to 20 hours to carry out secondary sintering to obtain the above-described refractory.

In the manufacturing method of the present invention, magnesia and titanium oxide are mixed beforehand, subjected to primary firing and pulverized to fine particles having an average particle diameter of at most 1 mm so that fine particles of magnesium orthotitanate and fine particles of magnesium oxide can be obtained simultaneously. Therefore, by mixing the particles of the sintered mass with the above-described magnesia particles, magnesia particles are mixed together with fine particles of magnesium orthotitanate and fine particles of magnesia, so that these fine particles are filled properly between he coarse and medium magnesia particles.

Manufacturing Method 3

The refractory of the present invention can be manufactured also using magnesium orthotitanate in place of titanium oxide. More specifically, fine particles of magnesium orthotitanate are mixed uniformly with coarse and medium magnesia particles and the mixture is sintered to obtain a refractory in which magnesium orthotitanate ($Mg_2TiO_4$) phases intervene along the grain boundaries of the magnesia particles.

As in the above-described manufacturing method, magnesia suitably comprises 10 to 50 wt. % of coarse particles having an average particle diameter of at least 1 mm, preferably 2 to 5 mm, and 10 to 50 wt. % of medium particles having an average particle diameter of 1 to 0.15 mm, preferably 0.8 to 0.3 mm. The magnesia particles may be the one which comprises 50 wt. % or less of fine particles having an average particle diameter of at most 1 mm. With below 50 wt. % of the coarse or medium magnesia particles, no sufficient mechanical strength can be obtained. As the magnesium orthotitanate, fine particles having an average particle diameter of at most 0.15 mm may be used.

Proportion of magnesia to magnesium orthotitanate is suitably 50 to 94 wt. % of magnesia to 4 to 50 wt. % of magnesium orthotitanate, preferably 60 to 96 wt. % of magnesia to 4 to 40 wt. % of magnesium orthotitanate.

EXAMPLES AND COMPARATIVE EXAMPLES

Now, some examples of the present invention will be shown, together with some comparative examples. The examples are intended only for illustrative purposes, and do not in any sense limit the scope of the present invention. In the following examples and comparative examples, spalling tests, creep tests and slag erosion tests were conducted according to the methods set forth below.

(1) Spalling Tests

Standard straight brick samples (230×114×65 mm) were placed so that longitudinally ⅓ portions thereof were protruded in the furnace, central ⅓ portions thereof were pinched by the brick frame of the door of the furnace, and the rest ⅓ portions thereof were exposed to open air, and kept in an internal furnace temperature of 1,400° C. for 30 minutes, and then taken out of the furnace and left to stand to cool for 30 minutes. This procedure was repeated until a portion of the sample peels off. The number of repetition was defined as spalling time number.

(2) Creep Tests

Compressive force of 10 Kg/cm² was applied to column samples (50 mmφ, 50 mmH), which were then kept at 1,250° C. for 50 hours and compression ratios were measured.

(3) Slag Erosion Tests

Using a rotary penetration tester, trapezoidal brick samples (bottom surface: 100×160 mm, height: 50 mm, upper surface 40×160 mm) were attached to a rotary furnace, and while rotating the rotary furnace at a speed of 2 rpm, the inside of the furnace was heated at 1,300° C. in an oxidative atmosphere by the use of an oxygen-acetylene burner equipped at one side of the furnace, to which furnace there was charged 1 kg of ferrite slag (Fe oxides: 62 wt. %, Ca oxides: 16 wt. %, Cu oxides: 17 wt. %) and kept for 1 hour. Thereafter, the furnace was tilted to discharge 500 g of the slag, followed by charging 500 g of fresh ferrite slag. This procedure was repeated for every 1 hour and continued for a total of 12 hour. Then, the samples were cut and depth of erosion by slag and depth of penetration of slag were determined by microscopic observation. The depth of erosion was obtained by comparing the thickness of the brick before the test with the thickness of the brick after the test with respect to the in-furnace end of the sample, and expressed by a loss in thickness while depth of penetration was expressed by the thickness of the modified layer in the direction of from the surface contacting the melt toward the outer periphery of the sample.

Example 1 (Directbond Refractory)

Magnesia powder (particle size: 40 to 200μ) and titanium oxide powder (particle size: 40 to 200μ) were mixed in proportions shown in Table 1, and the mixed starting material was pressure-molded at a pressure of 1,500 Kg/cm², and fired at 1,400° to 1,500° C. for 48 hours in open air to manufacture refractory samples each weighing 7 g. Table 1 shows the apparent specific gravity and apparent porosity of the refractories.

The refractory samples were immersed in calcium ferrite slag (copper smelting slag having a composition in wt. % of: $F_2O_3$: 70, CaO: 15, $Cu_2O$: 15), and left to stand for 48 hours. Then depth of erosion and depth of penetration were determined. Further, spalling resistance and creep resistance of the refractory samples were determined. Table 1 shows the results together.

As shown in Table 1, the sample (Nos. 1 and 2) having a titanium oxide content of 0 to less than 1 wt. % had a poor erosion resistance and also a low spalling resistance. The samples (Nos. 10 and 11) having titanium oxide contents above 50 wt. %, respectively, differed in the formed mineral phases of magnesium titanate from the refractory of the present invention and, hence, poor erosion resistances. On the other hand, the samples (Nos. 3 to 7) having titanium oxide contents of 1 to 50% by weight, respectively, showed much increased erosion resistances. In this example, the particle size of the starting material particles was not adjusted and as a result the samples (Nos. 3 and 4) containing 1 to less than 10 wt. % of titanium oxide showed a little low spalling resistance but the samples (Nos. 5, 6 and 7) containing 10 to 30 wt. % of titanium oxide had excellent spalling resistances. On the other hand, the samples (Nos. 8 and 9) containing above 30 wt. % of titanium oxide were low in compression strength. Therefore, in order to obtain a refractory which has high mechanical strength as well as high erosion resistance, the amount of titanium oxide is suitably at most 30 wt. %, preferably at most 25 wt. %.

During immersion of a portion of the above-described samples (Nos. 3 to 7) in slag, slag was sampled with a steel rod at certain intervals of time and the amounts of titania and magnesia having been dissolved into slag were measured. It was confirmed as a result that the measured concentrations of magnesia and titania were on such a very low level as 0.5 to 1% and at most 0.03%, respectively, an there was no remarkable change with time, thus suggesting an excellent erosion resistance.

Figure 2:
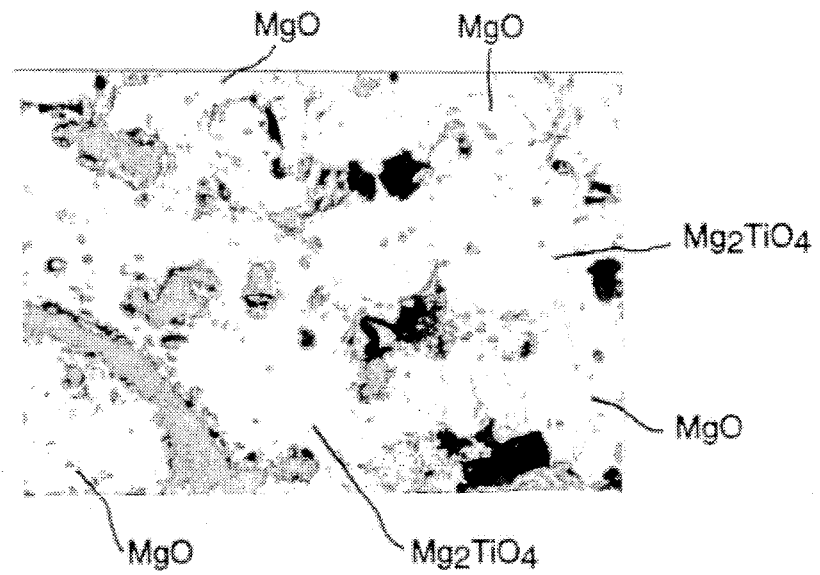
FIG. 2 is a microphotograph illustrating the state of the texture of the refractory of Example 1 before immersion in slag (X40)
Figure 3:
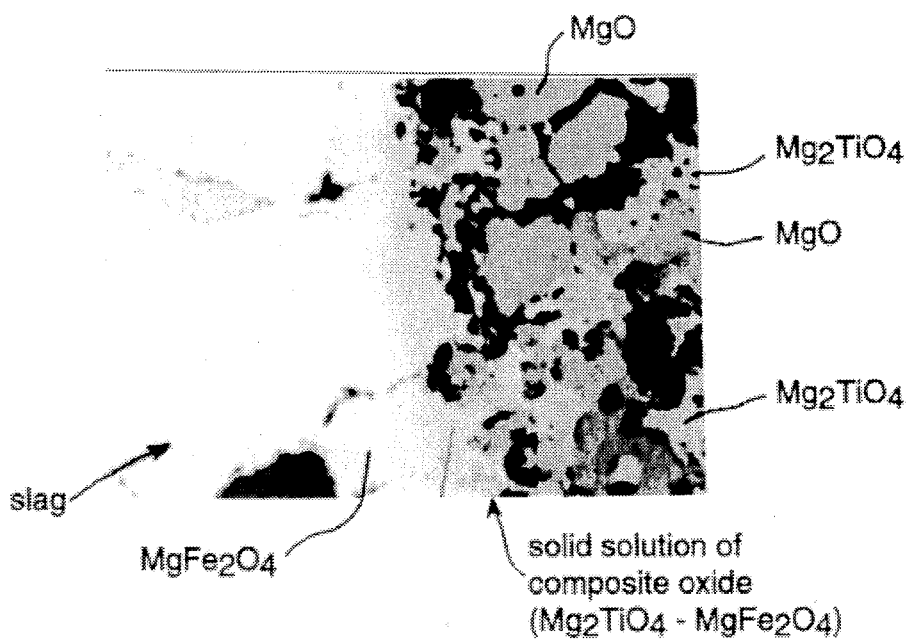
FIG. 3 is a microphotograph illustrating the state of the texture of the refractory of Example 1 after immersion in slag (X40)
Figure 4:
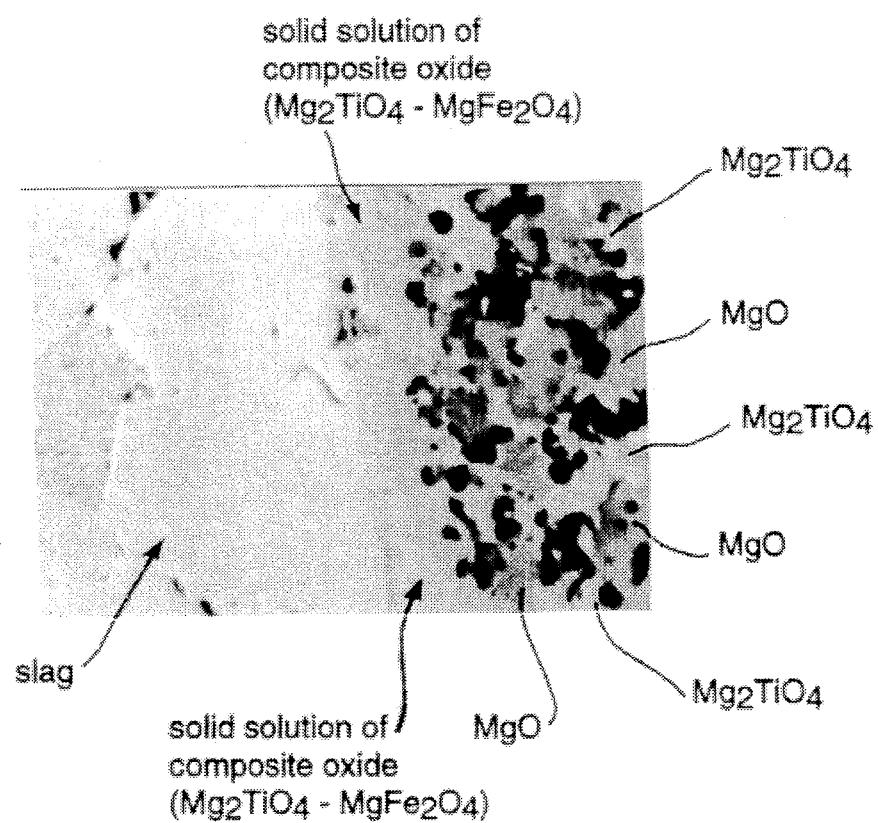
FIG. 4 is a microphotograph illustrating the state of the texture of the refractory of Example 1 after immersion in slag (X40)

For a portion of the above-described samples (Nos. 3 to 7), microphotographs of the textures thereof were illustrated in FIGS. 2, 3 and 4. FIG. 2 illustrates the texture before the slag test, and FIGS. 3 and 4 illustrate the textures after the immersion in slag, respectively. The composition of the mineral phases illustrated in the drawings were confirmed by EPMA analysis. As illustrated in FIG. 2, the refractory contained $Mg_2TiO_4$ intervening between the MgO particles, and these were integrally sintered to form a refractory.

On the other hand, when this contacted calcium ferrite slag, composite oxide phases composed of a solid solution of $Mg_2TiO_4$-$MgFe_2O_4$ along the interface between the refractory and slag as shown in FIGS. 3 and 4, which covers the surface of the refractory to prevent the penetration of slag into the inside of the refractory, so that the interior of the refractory maintains MgO and $Mg_2TiO_4$ as before the immersion in slag.

Example 2

A uniform mixture of magnesia particles and titanium oxide particles having particle sizes and amounts shown in Table 2 was used as a starting material, which was heated for sintering under the same conditions as in Example 1 to obtain refractories of the same size. The refractory samples were subjected to the same slag immersion tests, spalling tests and creep tests as in Example 1. Table 2 shows the results together.

As will be clear from the results shown in Table, 2, the refractory samples obtained by the use of magnesia particles composed of coarse particles having an average particle diameter of at least 1 mm or by the use of such coarse particles together with medium particles having an average particle diameter of 1 to 0.15 mm in a total amount of 50 wt. %, showed high compression strengths even when it contained 2 wt. % of titanium oxide and were excellent in erosion resistance and thermal stability.

Example 3 (Semi-Rebond Refractory)

Magnesia clinker (MgO: 0 98 wt. % or more) and synthetic rutile ($TiO_2$: 93 wt. % or more) were mixed in amounts shown in Table 3, pulverized to 100 mesh or less, and then subjected to primary firing at 1,500° C. to form magnesium orthotitanate, which was pulverized again to obtain powder having a particle size of 40μ to 100μ. The powder was mixed with coarse magnesia particles having a particle diameter of 1 to 4 mm and medium particles having a particle diameter of 0.15 to 1 mm in proportions shown in Table 3, and the mixture was compression molded into a rectangle at a pressure of 1,200 Kg/cm², and subjected to secondary firing in open air at 1,470° C. over 16 hours to obtain standard straight bricks (semi-rebond bricks: 230× 114×65 mm).

Table 3 shows the apparent specific gravity and apparent porosity of each sample. For each sample, there were performed spalling tests, creep tests and slag immersion tests the same as in Example 1. Table 3 shows the results together. From Table 3, it was confirmed that each of the samples in this example showed excellent thermal stability and excellent erosion resistance in basic atmospheres.

Example 4 (Rebond Refractory)

The same magnesia clinker and synthetic rutile as used in Example 3 were mixed in a proportion of 9:1, subjected to primary firing, and pulverized to obtain a pulverizate containing magnesia and magnesium orthotitanate in admixture. The particle size of the primary fired pulverizate was adjusted so that it contained 34 wt. % of coarse particles having a particle diameter of 1 to 4 mm, 33 wt. % of medium particles having a particle diameter of 0.15 to 1 mm, and 33 wt. % of fine particles having a particle diameter of at most 0.15 mm, the mixture was uniformly mixed with magnesia particles, pressure molded at the same pressure as in Example 3, and subjected to secondary firing at 1,470° C. to obtain refractory bricks (rebond bricks). The bricks were measured of spalling resistance and creep resistance. Table 4 shows the results.

The bricks of this example showed substantially the same erosion resistances and high-temperature strengths as the samples in Example 3 although spalling time number was somewhat lower than the samples in Example 3.

Dissolution Tests

Figure 5:
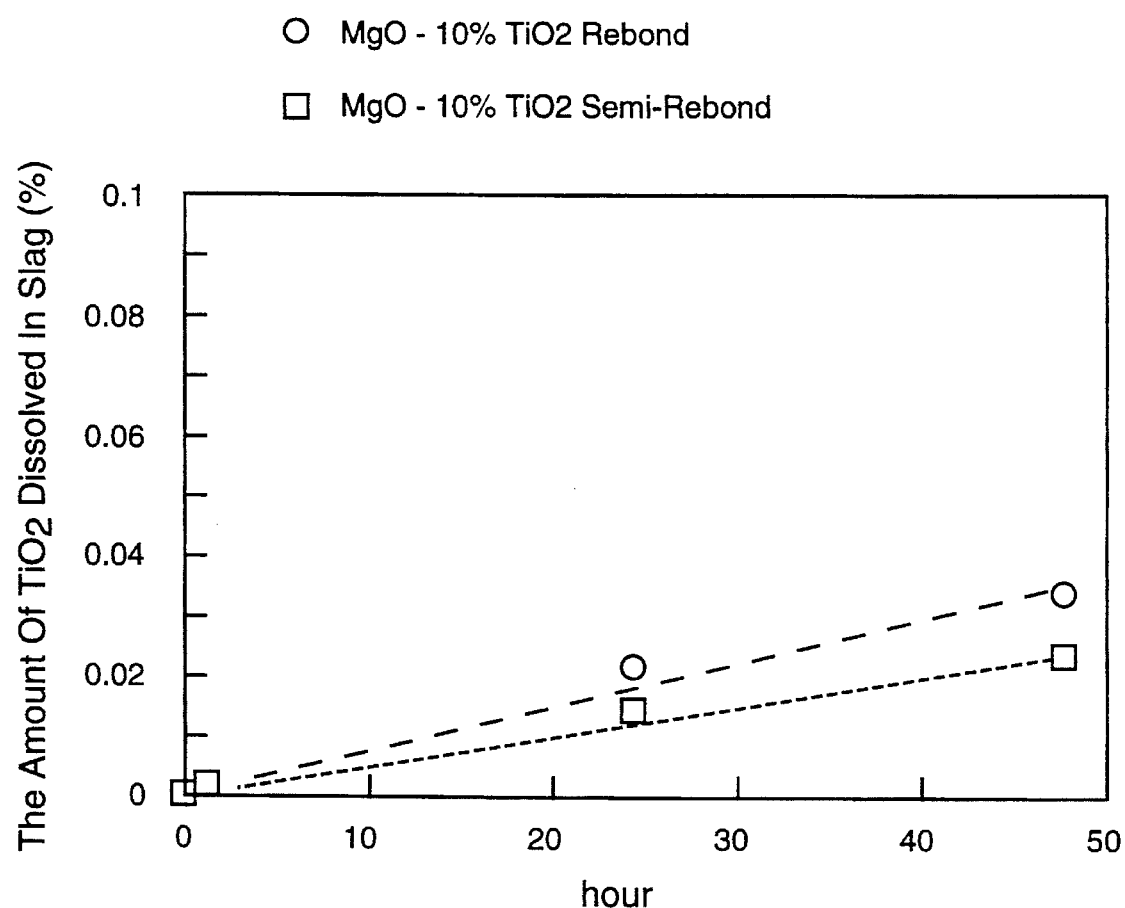
FIG. 5 is a graph illustrating the amounts of titanium oxide dissolved in slag from the refractories of Examples 3 and 4, respectively.
Figure 6:
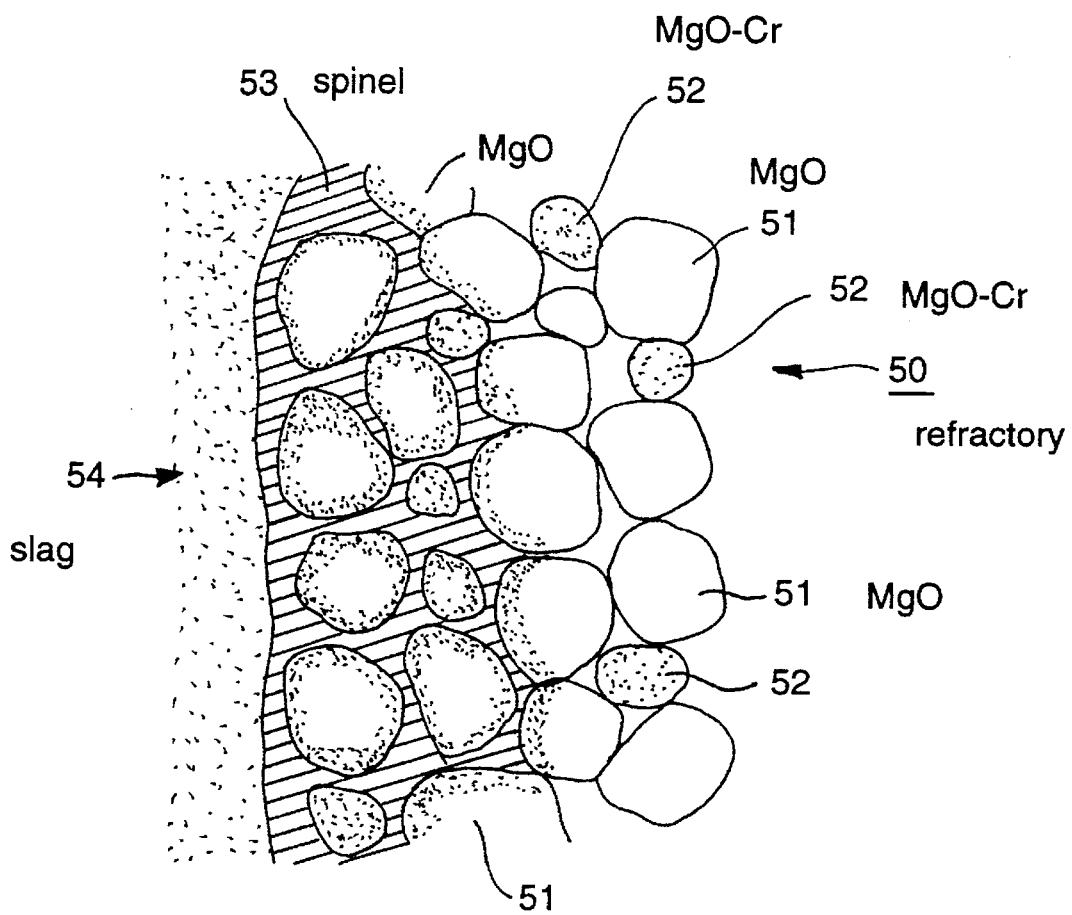
FIG. 6 is a schematic cross-sectional representation illustrating the state of the texture near the interface between the refractory and the slag when the conventional magnesia-chromia refractory is immersed in slag.

The samples in Examples 3 and 4, fixed at the tip of a supporting rod, were immersed in slag and rotated at a speed of 50 rpm. The slag around the sample was sampled at certain intervals of time and the amount of $TiO_2$ which dissolved into the slag was measured. FIG. 5 shows the results. As illustrated in this graph, the refractory of Example 3 gave titanium oxide dissolved in a smaller amount than the refractory of Example 4, thus showing a higher resistance to erosion by slag. After the tests, the samples were taken out from the slag, and the immersed portions were observed. As a result, the samples of Examples showed no remarkable change in the appearance while a slight swelling by the penetration of slag was observed in the samples of Example 4.

Example 5

Refractories were manufactured by repeating the procedures in Example 1 except that magnesium orthotitanate was used in place of titanium oxide and that magnesia and magnesium orthotitanate were mixed in proportions shown in Table 5. The refractories thus obtained were subjected to slag erosion tests, spalling tests and creep tests similarly to Example 1. Table 5 shows the results. the refractories of this example were excellent in erosion resistance and thermal stability.

Comparative Example

Mg-Cr refractory was manufactured in the same manner as in Example 3 except that 15 wt. % chromium oxide was used in place of synthetic rutile, and slag erosion tests, spalling tests and creep tests were made on these refractories. Table 3 shows the result. The refractory of this comparative example underwent much erosion by slag and showed a very small spalling time number, thus showing a poor thermal stability.

TABLE 1

Refractory of Example 1 (Directbond Method)

| Sample No. | MgO wt. % | TiO$_2$ wt. % | Firing Temperature °C. | Mineral Phase | Specific Gravity g/cm$^3$ | Porosity % | Compression Strength Kg/cm$^2$ | SP Time Number | Creep % | Erosion Depth mm | Penetration Depth mm | Evaluation |
|---|---|---|---|---|---|---|---|---|---|---|---|---|
| 1 | 100 | — | 1,800 | — | 3.40 | 19.0 | 700 | 3 | 0.8 | 6.0 | 70 | x |
| 2 | 99.5 | 0.5 | 1,500 | Mg$_2$TiO$_4$ | 3.42 | 18.3 | 680 | 5 | 0.8 | 5.8 | 68 | x |
| 3 | 99 | 1 | 1,500 | Mg$_2$TiO$_4$ | 3.44 | 15.0 | 680 | 9 | 0.9 | 3.0 | 20 | ○ |
| 4 | 98 | 2 | 1,500 | Mg$_2$TiO$_4$ | 3.46 | 16.2 | 680 | 10 | 0.9 | 2.9 | 18 | ⊙ |
| 5 | 90 | 10 | 1,500 | Mg$_2$TiO$_4$ | 3.48 | 14.0 | 680 | 20 | 1.0 | 2.8 | 12 | ⊙ |
| 6 | 80 | 20 | 1,500 | Mg$_2$TiO$_4$ | 3.60 | 14.1 | 630 | 17 | 1.1 | 2.3 | 6 | ⊙ |
| 7 | 70 | 30 | 1,500 | Mg$_2$TiO$_4$ | 3.64 | 14.3 | 600 | 10 | 1.2 | 3.0 | 20 | ○ |
| 8 | 60 | 40 | 1,500 | Mg$_2$TiO$_4$ | 3.65 | 14.2 | 350 | 7 | 1.3 | 4.5 | 40 | Δ |
| 9 | 50 | 50 | 1,500 | Mg$_2$TiO$_4$ | 3.63 | 15.2 | 340 | 5 | 1.5 | 5.2 | 60 | Δ |
| 10 | 40 | 60 | 1,400 | MgTiO$_3$ + Mg$_2$TiO$_4$ | 3.65 | 17.2 | 380 | 3 | 1.4 | 6.4 | 60 | x |
| 11 | 20 | 80 | 1,500 | MgTi$_2$O$_5$ | 3.40 | 19.0 | 320 | 20 | 4.5 | 8.0 | 70 | x |

Notes:
The column of mineral phase indicates mineral phases other than magnesia in the refractory.
SP time number indicates spalling time number, with 20 or more being preferred.
Creep of 1.1% or more is preferred.
Erosion depth of above 3 cm means failure.
Penetration depth of above 20 cm means failure.
In the column of evaluation, double circle means excellent; single circle means good; triangle means fair; cross means failure.

TABLE 2

Refractories of Example 2 (Directbond Method With Particle Size Adjustment)

| Sample No. | MgO (wt. %) Coarse Particle | MgO (wt. %) Medium Particle | MgO (wt. %) Fine Particle | TiO$_2$ wt. % | Mineral Phase | Specific Gravity g/cm$^3$ | Porosity % | Compression Strength Kg/cm$^2$ | SP Time Number | Creep % | Erosion Depth mm | Penetration Depth mm | Evaluation |
|---|---|---|---|---|---|---|---|---|---|---|---|---|---|
| 20 | 34 | 33 | 32 | 1 | Mg$_2$TiO$_4$ | 3.43 | 15.5 | 680 | 9 | 0.9 | 3.0 | 20 | ○ |
| 21 | 30 | 20 | 48 | 2 | Mg$_2$TiO$_4$ | 3.46 | 16.3 | 680 | 9 | 0.9 | 2.9 | 18 | ⊙ |
| 22 | 34 | 33 | 23 | 10 | Mg$_2$TiO$_4$ | 3.47 | 14.5 | 580 | 20 | 1.0 | 2.8 | 12 | ⊙ |
| 23 | 30 | 25 | 25 | 20 | Mg$_2$TiO$_4$ | 3.60 | 14.1 | 630 | 17 | 1.1 | 2.3 | 7 | ⊙ |
| 24 | 27 | 26 | 17 | 30 | Mg$_2$TiO$_4$ | 3.63 | 14.5 | 620 | 10 | 1.2 | 3.0 | 20 | ○ |

Notes:
Coarse particle has an average particle diameter of at least 1 mm, medium particle has an average particle diameter of 1 to 0.15 mm, and fine particle has an average diameter of at most 0.15 mm.
Numerical values for each particle size of MgO is by wt %.
Particle size of TiO$_2$ is fine particle.
The column of mineral phase indicates mineral phases other than magnesia in the refractory.
SP time number indicates spalling time number, with 20 or more being preferred.
Creep of 1.1% or more is preferred.
Erosion depth of above 3 cm means failure.
Penetration depth of above 20 cm means failure.
In the column of evaluation, double circle means excellent; single circle means good; triangle means fair; cross means failure.

TABLE 3

Refractories of Example 3 (Semi-rebond Method)

| Sample No. | MgO (wt. %) Coarse Particle | MgO (wt. %) Medium Particle | Primary Firing Pulverizate (wt. %) MgO | Primary Firing Pulverizate (wt. %) Mg$_2$TiO$_4$ | Mineral Phases | Porosity % | SP Time Number | Creep % | Erosion Depth mm | Penetration Depth mm | Evaluation |
|---|---|---|---|---|---|---|---|---|---|---|---|
| 30 | 34 | 33 | 13.2 | 19.8 | Mg$_2$TiO$_4$ | 14.2 | 21 | 1.1 | 2.3 | 10 | ⊙ |
| 31 | 34 | 33 | 23.1 | 9.9 | Mg$_2$TiO$_4$ | 14.2 | 21 | 1.0 | 2.3 | 18 | ⊙ |
| 32 | 33 | 33 | 28 | 6 | Mg$_2$TiO$_4$ | 18 | 20 | 0.8 | 2.6 | 19 | ⊙ |
| 33 | 33 | 33 | 17 | 17 | Mg$_2$TiO$_4$ | 16 | 25 | 0.9 | 1.8 | 14 | ⊙ |
| 34 | 33 | 33 | 2 | 32 | Mg$_2$TiO$_4$ | 14 | 23 | 1.0 | 1.9 | 13 | ⊙ |
| 35 | 30 | 20 | 25 | 25 | Mg$_2$TiO$_4$ | 13.5 | 24 | 1.1 | 1.7 | 12 | ⊙ |
| 36 | 27 | 26 | 0 | 47 | Mg$_2$TiO$_4$ | 13 | 21 | 1.1 | 2.1 | 15 | ⊙ |
| 37 | 33 | 33 | 31 | 3 | Mg$_2$TiO$_4$ | 22 | 14 | 0.5 | 3.2 | 22 | x |

TABLE 3-continued

Refractories of Example 3 (Semi-rebond Method)

| Sample No. | MgO (wt. %) Coarse Particle | MgO (wt. %) Medium Particle | Primary Firing Pulverizate (wt. %) MgO | Primary Firing Pulverizate (wt. %) $Mg_2TiO_4$ | Mineral Phases | Porosity % | SP Time Number | Creep % | Erosion Depth mm | Penetration Depth mm | Evaluation |
|---|---|---|---|---|---|---|---|---|---|---|---|
| 38 | 33 | 33 | 27.6 | 6.4* | $MgCr_2O_4$ | 18.5 | 5 | 0.9 | 3.4 | 26 | x |

Notes:
Coarse particle has an average particle diameter of at least 1 mm, medium particle has an average particle diameter of 1 to 0.15 mm, and fine particle has an average diameter of at most 0.15 mm.
Particle size of primary fired pulverizate is fine particle aving a particle diameter of at most 0.15 mm.
The column of mineral phase indicates mineral phases other than magnesia in the refractory.
SP time number indicates spalling time number, with 20 or more being preferred.
Creep of 1.1% or more is preferred.
Erosion depth of above 3 cm means failure.
Penetration depth of above 20 cm means failure.
In the column of evaluation, double circle means excellent; single circle means good; triangle means fair; cross means failure.
The amount (6.4*) of the primary fired pulverizate for Sample No. 38 is the amount of $MgCr_2O_4$.

TABLE 4

Refractories of Example 4 (Rebond Method)

| Sample No. | MgO (Coarse to Fine) wt. % | $Mg_2TiO_4$ (Coarse to Fine) | Mineral Phase | Porosity % | SP Time Number % | Creep % | Erosion Depth mm | Penetration Depth | Evaluation |
|---|---|---|---|---|---|---|---|---|---|
| 40 | 60 | 40 | $Mg_2TiO_4$ | 14.5 | 12 | 1.1 | 2.4 | 10 | ◉ |
| 41 | 70 | 30 | $Mg_2TiO_4$ | 14.8 | 14 | 1.0 | 2.5 | 13 | ◉ |
| 42 | 80 | 20 | $Mg_2TiO_4$ | 17.6 | 17 | 0.9 | 2.5 | 13 | ○ |
| 43 | 90 | 10 | $Mg_2TiO_4$ | 18.2 | 13 | 1.0 | 2.5 | 17 | ○ |
| 44 | 94 | 6 | $Mg_2TiO_4$ | 21.4 | 12 | 1.1 | 2.6 | 18 | △ |

Notes:
Magnesia particle and $Mg_2TiO_4$ are mixtures of coarse, medium and fine particles.
$Mg_2TiO_4$ is expressed as coarse to fine particles obtained by primary fired pulverization, and as the amount of $Mg_2TiO_4$ in the refractory.
The column of mineral phase indicates mineral phases other than magnesia in the refractory.
SP time number indicates spalling time number, with 20 or more being preferred.
Creep of 1.1% or more is preferred.
Erosion depth of above 3 cm means failure.
Penetration depth of above 20 cm means failure.
In the column of evaluation, double circle means excellent; single circle means good; triangle means fair; cross means failure.

TABLE 5

Refractories of Example 5 (mixed with magnesia orthotitanate)

| Sample No. | MgO (wt. %) Coarse Particle | MgO (wt. %) Medium Particle | MgO (wt. %) Fine Particle | $TiO_2$ wt. % | Mineral Phase | Specific Gravity g/cm³ | Porosity % | Compression Strength Kg/cm² | SP Time Number | Creep % | Erosion Depth mm | Penetration Depth mm | Evaluation |
|---|---|---|---|---|---|---|---|---|---|---|---|---|---|
| 20 | 33 | 33 | 30 | 4 | $Mg_2TiO_4$ | 3.43 | 18.2 | 680 | 16 | 0.7 | 2.8 | 19 | ◉ |
| 21 | 34 | 33 | 23 | 10 | $Mg_2TiO_4$ | 3.47 | 14.2 | 680 | 20 | 1.0 | 2.3 | 18 | ◉ |
| 22 | 34 | 33 | 13 | 20 | $Mg_2TiO_4$ | 3.48 | 14.1 | 680 | 21 | 1.1 | 2.3 | 10 | ◉ |
| 23 | 33 | 33 | 4 | 30 | $Mg_2TiO_4$ | 3.52 | 14.0 | 670 | 20 | 1.1 | 1.7 | 13 | ◉ |
| 24 | 30 | 30 | 0 | 40 | $Mg_2TiO_4$ | 3.60 | 13.5 | 630 | 19 | 1.1 | 2.1 | 16 | ◉ |

Notes:
Coarse particle has an average particle diameter of at least 1 mm, medium particle has an average particle diameter of 1 to 0.15 mm, and fine particle has an average diameter of at most 0.15 mm.
Numerical values for each particle size of MgO is by wt %.
Particle size of $Mg_2TiO_2$ is fine particle.
The column of mineral phase indicates mineral phases other than magnesia in the refractory.
SP time number indicates spalling time number, with 20 or more being preferred.
Creep of 1.1% or more is preferred.
Erosion depth of above 3 cm means failure.
Penetration depth of above 20 cm means failure.
In the column of evaluation, double circle means excellent; single circle means good; triangle means fair; cross means failure.

What is claimed is:

1. A refractory having a spalling time number of at least 20 and an apparent porosity of 12% to 20%, said refractory consisting essentially of integrally sintered magnesium oxide particles and a mineral phase of magnesium orthotitanate ($Mg_2TiO_4$) intervening between said magnesium oxide particles, wherein the magnesium oxide content of said refractory is 50 to 95 wt. % and the magnesium orthotitanate content is 4 to 50 wt. % and wherein said magnesium oxide particle content of said refractory comprises 10 to 50 wt. % coarse particles having an average particle diameter of at least 1 mm, and 10 to 50 wt. % medium particles having an average particle diameter of less than 1 mm.

2. The refractory of claim 1, wherein said medium particles of magnesium oxide have an average particle diameter of from 0.15 to less than 1 mm.

3. The refractory of claim 1, wherein the content of said magnesium orthotitanate is 4 to 40 wt. %.

4. The refractory of claim 1, wherein the content of said magnesium oxide is 50 to 80 wt. %.

5. A method for manufacturing a refractory having a mineral phase of magnesium orthotitanate intervening between magnesium oxide particles integrally sintered and having a spalling time number of at least 20 and an apparent porosity of 12% to 20%, which comprises the steps of, uniformly mixing magnesium oxide particles comprising one member selected from the group consisting of coarse magnesium particles having an average particle diameter of at least 1 mm, and a mixture of coarse magnesium oxide particles and medium magnesium oxide particles having an average particle diameter of 0.15 to less than 1 mm with titanium oxide particles having an average particle diameter of at most 0.15 mm, and firing the mixture at 1,400° to 1,700° C.

6. The method of claim 5, wherein said mixture consists essentially of 75 to 98 wt. % of magnesium oxide and 2 to 25 wt. % of titanium oxide.

7. The method of claim 5, wherein said mixture consists essentially of 80 to 98 wt. % of magnesium oxide and 2 to 20 wt. % of titanium oxide.

8. A method for manufacturing a refractory having a mineral phase of magnesium orthotitanate intervening between magnesium oxide particles integrally sintered and having a spalling time number of at least 20 and an apparent porosity of 12% to 20%, which comprises the steps of firing a first mixture consisting essentially of magnesium oxide and titanium oxide to form a primary sintered mass, pulverizing the primary sintered mass to form pulverant particles; mixing said pulverant particles with one member selected from the group consisting of coarse magnesium oxide particles having an average particle diameter of at least 1 mm and a mixture of coarse and medium magnesium oxide particles having an average particle diameter of 0.15 to less than 1 mm to form a second mixture; and heating the second mixture to carry out a secondary sintering to obtain the refractory.

9. The method of claim 8, wherein the first mixture consisting essentially of 50 to 96 wt. % of magnesium oxide and 4 to less than 50 wt. % of titanium oxide is fired at 1,400° to 1,700° C. to form the primary sintered mass, and wherein said primary sintered mass is pulverized to form the pulverant particles having an average particle diameter of at most 0.15 mm, and wherein said second mixture consists essentially of 5 to 50 wt. % of the pulverant particles and 50 to 95 wt. % of magnesium oxide particles, whereby, the magnesium orthotitanate content of the refractory is 4 to 50 wt. %, and wherein the secondary sintering heating step is conducted at 1,400° to 1,700° C.

10. The method of claim 9, wherein said second mixture consists essentially of 20 to 50 wt. % of the pulverant particles and 50 to 80 wt. % of the magnesium oxide particles, and wherein the magnesium orthotitanate content of the refractory is 4 to 40 wt. %.

11. A method for manufacturing a refractory having a mineral phase of magnesium orthotitanate intervening between magnesium oxide particles integrally sintered and having a spalling time number of at least 20 and an apparent porosity of 12% to 20%, which comprises the steps of providing a uniform mixture consisting essentially of magnesium oxide particles and magnesium orthotitanate particles; and sintering said mixture.

12. The method of claim 11, wherein the magnesium oxide particles comprise one member selected from the group consisting of coarse magnesium oxide particles having an average particle diameter of at least 1 mm, and a mixture of coarse magnesium oxide particles and medium magnesium oxide particles having an average particle diameter of 0.15 to less than 1 mm, and wherein the magnesium orthotitanate particles have an average particle diameter of at most 0.15 mm.

13. The method of claim 12, wherein the uniform mixture consists essentially of 50 to 96 wt. % of magnesium oxide and 4 to 50 wt. % of magnesium orthotitanate.

14. The method of claim 12, wherein the uniform mixture consists essentially of 60 to 96 wt. % of magnesium oxide and 4 to 40 wt. % of magnesium orthotitanate.

* * * * *

UNITED STATES PATENT AND TRADEMARK OFFICE
CERTIFICATE OF CORRECTION

PATENT NO. : 5,595,948
DATED : January 21, 1997
INVENTOR(S) : Etsuji Kimura, Kenichi Yamaguchi, Fumihiko Ogino and Susumu Okabe It is certified that error appears in the above-indentified patent and that said Letters Patent is hereby corrected as shown below:

Column 2 Line 1 "1,900°C. the" should read --1,900°C. The--.

Column 5 Line 62 after "compared" insert --with--.

Column 6 Line 16 "serves" should read --serve--.

Column 6 Line 16 "maintains" should read --maintain--.

Column 9 Line 35 "surrounds" should read --surround--.

Column 10 Line 52 "is" should read --are--.

Column 10 Line 56 "is" should read --are--.

Column 11 Line 16 "he coarse" should read --the coarse--.

Column 13 Line 7 "an" should read --and--.

Column 13 Line 38 "Table, 2," should read --Table 2,--.

Column 13 Line 50 "(MgO: 0 98 wt.% or more)" should read --(MgO: 98 wt.% or more)--.

Column 14 Line 52 "similarly" should read --similar--.

Column 14 Line 53 "results. the" should read --results. The--.

UNITED STATES PATENT AND TRADEMARK OFFICE
CERTIFICATE OF CORRECTION

PATENT NO. : 5,595,948

DATED : January 21, 1997

INVENTOR(S) : Etsuji Kimura, Kenichi Yamaguchi, Fumihiko Ogino and Susumu Okabe

It is certified that error appears in the above-indentified patent and that said Letters Patent is hereby corrected as shown below:

Columns 15-16, Table 2, see column heading "Penetration Depth": delete extra space between "Penetra-" and "tion".

Columns 15-16, Table 2, under column heading "SP Time Number", row Sample No. 20, "9" should read --8---.

Columns 15-16, Table 2, under column heading "Compression Strength", row Sample No. 22, "580" should read --680--.

Columns 17-18, Table 3, under "Notes," sentence beginning "Particle size": "aving should read --having--.

Columns 17-18, Table 4, under column heading "SP Time Number %", delete "%".

Columns 17-18, Table 4, under column heading "Creep mm", delete "mm" and insert --%--.

Columns 17-18, Table 4, under column heading "Penetration Depth": after "Depth" insert --mm--.

UNITED STATES PATENT AND TRADEMARK OFFICE
CERTIFICATE OF CORRECTION

PATENT NO. : 5,595,948
DATED : January 21, 1997
INVENTOR(S) : Etsuji Kimura, Kenichi Yamaguchi, Fumihiko Ogino and Susumu Okabe It is certified that error appears in the above-indentified patent and that said Letters Patent is hereby corrected as shown below:

Columns 17-18, Table 5, column heading "$TiO_2$ wt.%" should read --$Mg_2TiO_4$ wt.%--.

Columns 17-18, Table 5, under "Notes", see sentence beginning "Particle size": "$Mg_2TiO_2$" should read --$Mg_2TiO_4$--.

Signed and Sealed this

Third Day of June, 1997

Attest:

BRUCE LEHMAN

Attesting Officer

Commissioner of Patents and Trademarks